United States Patent [19]
Prinz

[11] Patent Number: 5,475,304
[45] Date of Patent: Dec. 12, 1995

[54] MAGNETORESISTIVE LINEAR DISPLACEMENT SENSOR, ANGULAR DISPLACEMENT SENSOR, AND VARIABLE RESISTOR USING A MOVING DOMAIN WALL

[75] Inventor: Gary A. Prinz, Alexandria, Va.

[73] Assignee: The United States of America as represented by the Secretary of the Navy, Washington, D.C.

[21] Appl. No.: 130,480

[22] Filed: Oct. 1, 1993

[51] Int. Cl.[6] .............................. G01B 7/00; G01R 33/02; H01L 43/00
[52] U.S. Cl. .................. 324/207.21; 324/252; 338/32 R
[58] Field of Search ............................ 324/207.21, 252, 324/207.23, 207.24, 207.25, 176; 338/32 R, 32 H, 14; 360/113

[56] References Cited

U.S. PATENT DOCUMENTS

| | | | |
|---|---|---|---|
| 4,402,770 | 9/1983 | Koon | 148/302 |
| 4,409,043 | 10/1983 | Koon | 148/403 |
| 4,956,736 | 9/1990 | Smith | 324/252 X |
| 5,134,533 | 7/1992 | Friedrich et al. | 338/32 R X |
| 5,206,590 | 4/1993 | Dieny et al. | 324/252 |
| 5,243,316 | 9/1993 | Sakakima et al. | 324/32 R |
| 5,287,238 | 2/1994 | Baumgart et al. | 324/252 X |
| 5,289,122 | 2/1994 | Shigeno | 324/207.21 X |
| 5,313,186 | 5/1994 | Schuhl et al. | 338/32 R |
| 5,341,118 | 8/1994 | Parkin et al. | 324/252 X |

OTHER PUBLICATIONS

"Magnetoresistive Sensor with a Synthetic Anti-Ferronmagnet, and a Method of Producing the Sensor", International Application WO 094015223A1, Jul. 1994.

Thompson et al., "Thin Film Magnetoresistors in Memory, Storage, and Related Applications", IEEE Transactions on Magnetics 11 (4) 1039–50 (Jul. 1975).

Binasch et al., "Enhanced Magnetoresistance in Layered Magnetic Structures With Antiferromagnetic Interlayer Exchange", Physical Rev. B. 39 (7) 4828–30 (Mar. 1, 1989).

*Primary Examiner*—Sandra L. O'Shea
*Assistant Examiner*—Jay M. Patidar
*Attorney, Agent, or Firm*—Thomas E. McDonnell; John J. Karasek

[57] ABSTRACT

A giant magnetoresistant displacement sensor includes at least one layered structure. This layered structure includes a harder magnetic (ferromagnetic or antiferromagnetic) layer having a fixed magnetic state, a second, softer, magnetic layer, and a metal layer interposed between and contacting these two layers to prevent exchange coupling between the two layers. The sensor also includes one or more indexing magnets for inducing a domain wall, at a measurand position, between regions of nonaligned magnetic fields in the softer magnetic layer; and an ohmmeter for measuring electrical resistance between points on opposite sides of the structure. In operation, the indexing magnets for inducing a domain wall are positioned relative to the giant magnetoresistant strip. The resistance across the strip is measured, and from this resistance measurement the position of the domain wall is determined. The present invention is also a variable resistor, which is operated by positioning the magnets for inducing the domain wall at a selected position, to set the resistance across the strip to a desired value.

20 Claims, 5 Drawing Sheets

5,475,304

MAGNETORESISTIVE LINEAR DISPLACEMENT SENSOR, ANGULAR DISPLACEMENT SENSOR, AND VARIABLE RESISTOR USING A MOVING DOMAIN WALL

BACKGROUND OF THE INVENTION

1. Field of the Invention

The present invention relates to linear and angular displacement sensors and to variable resistors, and more particularly to linear and angular displacement sensors and variable resistors using giant magnetoresistance.

2. Description of the Related Art

Linear and angular displacement sensors are used in high-precision machining and measuring, for manufacturing and testing components with very tight dimensional tolerances. These devices are typically coupled to lathes, presses, robot arms, etc.

Typical displacement sensors operate by measuring the inductance of a metal bar passing through a solenoid coil. These sensors have several drawbacks. They have limited precision, are bulky, are not readily portable, are sensitive to vibrations, are expensive to fabricate, and use large amounts of power in operation.

SUMMARY OF THE INVENTION

Accordingly, it is an object of this invention to make an inherently linear, high precision, compact, portable, vibration insensitive, displacement sensor that is inexpensive to fabricate, uses little power in operation, is non-volatile (i.e., does not lose calibration each time it is turned off), and has an output that can be converted readily to an electronic readout.

It is a further object of this invention to make a variable resistor sharing these features.

These and additional objects of the invention are accomplished by the structures and processes hereinafter described.

The present invention is a displacement sensor, having a giant magnetoresistant strip, including at least one layered structure. This layered structure includes a harder magnetic (hard ferromagnetic or antiferromagnetically-pinned) layer having a fixed magnetic state, a second, softer, magnetic layer, and a metal layer interposed between and contacting these two layers to prevent exchange coupling between the two layers. The invention also includes means for inducing a domain wall, at a measurand position, between regions of nonaligned (i.e., opposing or misaligned) magnetic fields in the softer magnetic layer, and means for measuring electrical resistance between points on opposite sides of the structure.

In operation, the means for inducing a domain wall is positioned relative to the giant magnetoresistant strip. The resistance across the strip is measured, and from this resistance measurement the position of the domain wall is determined. By fixing one workpiece to the giant magnetoresistant strip and another workpiece to the inducing means, the linear displacement between the two workpieces is monitored by monitoring electrical resistance.

The present invention is also a variable resistor, which is operated by positioning the means for inducing the domain wall at a selected position, to set the resistance across the strip to a desired value.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DETAILED DESCRIPTION OF THE PREFERRED EMBODIMENTS

Incorporated by reference herein is "ULTRA HIGH DENSITY, NON-VOLATILE FERROMAGNETIC RANDOM ACCESS MEMORY", U.S. patent application Ser. No. 08/130,479 filed Oct. 1, 1993, by Gary A. Prinz.

Giant magnetoresistance, or GMR, is a relatively newly-discovered phenomenon. Briefly stated, it has been discovered that there is a significant difference (on the order of between about 8% and about 20% ) in electrical resistance between the structure shown in FIG. 1 and the structure shown in FIG. 2.

Figure 1:
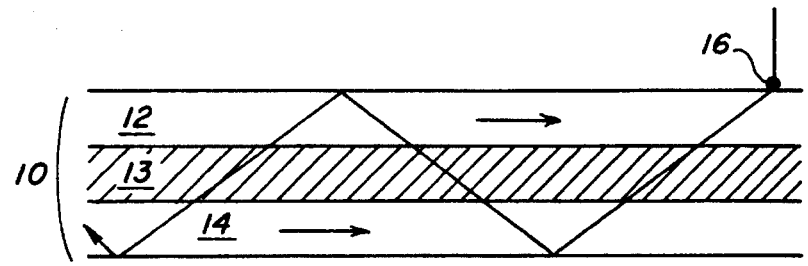
FIG. 1 is a cross-sectional view of a laminate structure with layers of aligned magnetic fields.

FIG. 1 shows a laminate structure 10 with ferromagnetic layers 12,14 having aligned magnetic fields, where these layers are separated by and in contact with a nonmagnetic conductive layer 13. As carriers (generally electrons) are injected from a contact 16 into the top ferromagnetic layer 12, the carriers are spin-polarized. These spin-polarized carriers are free to travel through this ferromagnetic layer and the other conductive layers 13,14 in this structure 10. Consequently, the electrical resistance experienced by the current associated with the flow of these carriers will be related to the thickness of this structure 10.

Figure 2:
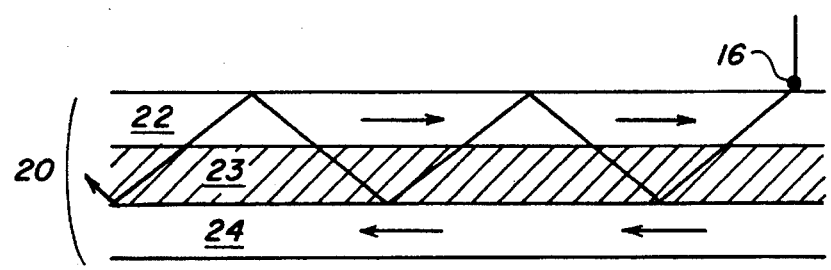
FIG. 2 is a cross-sectional view of a laminate structure with layers of opposing magnetic fields.

In contrast, FIG. 2 shows a laminate structure 20 with ferromagnetic layers 22,24 having opposing magnetic fields, separated by and in contact with a nonmagnetic conductive layer 23. As carriers are injected from a contact 16 into the top ferromagnetic layer 22, the carriers are spin-polarized. These spin-polarized carriers are free to travel through this ferromagnetic layer 22 and the adjacent nonmagnetic layer 23. However, when these spin-polarized carriers strike the interface with ferromagnetic layer 24 having a nonaligned magnetic field, the carriers are scattered back, away from this layer, according to the giant magnetoresistance (i.e., spin-valve) effect. Giant magnetoresistance is a function of the angle between the magnetic fields in the two layers. Scattering is minimized when the fields are parallel, and maximized when the fields are antiparallel (opposing). When the fields are opposing, the current associated with the flow of these carriers is impeded from traveling through the entire thickness of this structure 20, and the electrical resistance experienced by this current will be higher, related to the thickness of only the top two layers 22,23 of this structure 20.

Figure 3:
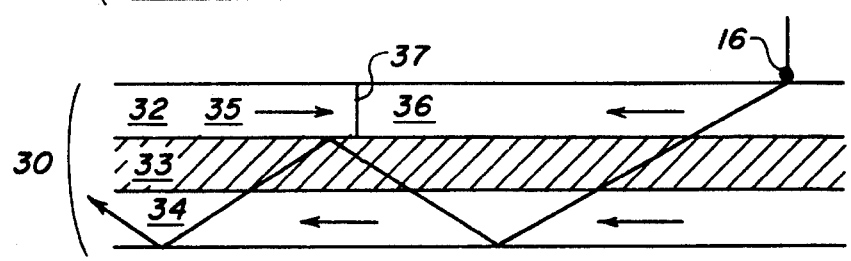
FIG. 3 is a side view of a laminate structure with a domain wall in one of the magnetic layers, separating regions of opposing magnetic fields in this layer.

An intermediate case according to the present invention is shown in FIG. 3. In this case, the laminate structure 30 has a bottom layer 34 with a fixed magnetic state, and a (relatively) soft magnetic top layer 32 with regions 35,36 of opposing magnetic fields. These regions 35,36 are separated by a domain wall 37. Between and contacting these two layers 32,34 is a nonmagnetic conductive metal layer 33 for preventing exchange coupling between the two magnetic layers 32,34. As carriers are injected from a contact 16 into the top ferromagnetic layer 32, the carriers are spin-polarized. These spin-polarized carriers are free to travel through this ferromagnetic layer 32, the nonmagnetic layer 33, and the bottom ferromagnetic layer 34. Because the effective thickness of the conductor is relatively large, electrical resistance will be relatively low on this side of the domain wall 37.

As the spin-polarized carriers travel further down this structure 30, to the far side of the domain wall 37, they will be confined to the bottom two layers 33,34 of the laminate structure 30, in accordance with the giant magnetoresistance effect. Electrical resistance will be relatively high on this side of the domain wall. Consequently, the overall electrical resistance of the laminar structure 30 will be a linear function of the location of the domain wall 37. Positioning the domain wall 37 toward the left of the laminar structure, away from the contact 16 injecting the carriers, will result in a relatively low electrical resistance for the laminar structure 30. Positioning the domain wall 37 toward the right of the laminar structure 30, near the contact 16 injecting the carriers, will result in a relatively high electrical resistance for the laminar structure 30.

Figure 3A:
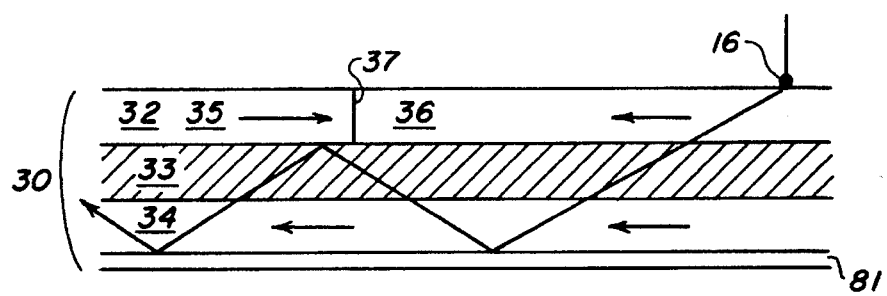
FIG. 3A is a side view of a laminate structure with a domain wall in one of the magnetic layers, separating regions of opposing magnetic fields in this layer, and with a antiferromagnetically-pinned layer having a fixed magnetic state.

Another embodiment of this laminate structure according to the invention is shown in FIG. 3A, where the bottom magnetic layer is fixed in its magnetic state with an antiferromagnetic pinning layer 81.

Note that the spin-polarized carriers travel a non-reciprocal path. If the carriers are injected from the left side of the domain wall 37, the spin-polarized carriers will be confined to the top two layers 32,33 of the laminate structure 30 on the near side of the domain wall 37, but will be free to travel through the entire thickness of the laminate structure 30 on the far side of the domain wall 37. In this case, moving the domain wall 37 to the left will decrease electrical resistance, while moving it to the right will increase electrical resistance.

Accordingly, a magnetoresistive displacement sensor will measure the relative position of two workpieces by fixing the first workpiece to a magnetoresistive laminar structure and fixing the second workpiece to means for inducing a domain wall in a relatively soft ferromagnetic layer in this laminar structure, and measuring the electrical resistance of the laminar structure as a function of the relative positions of the two workpieces. As used herein, workpieces are elements having a relative displacement measured by the sensor of the invention. Examples of workpieces, as the term is used herein, are machine parts having positions that need to be known with great accuracy and precision.

Figure 4:
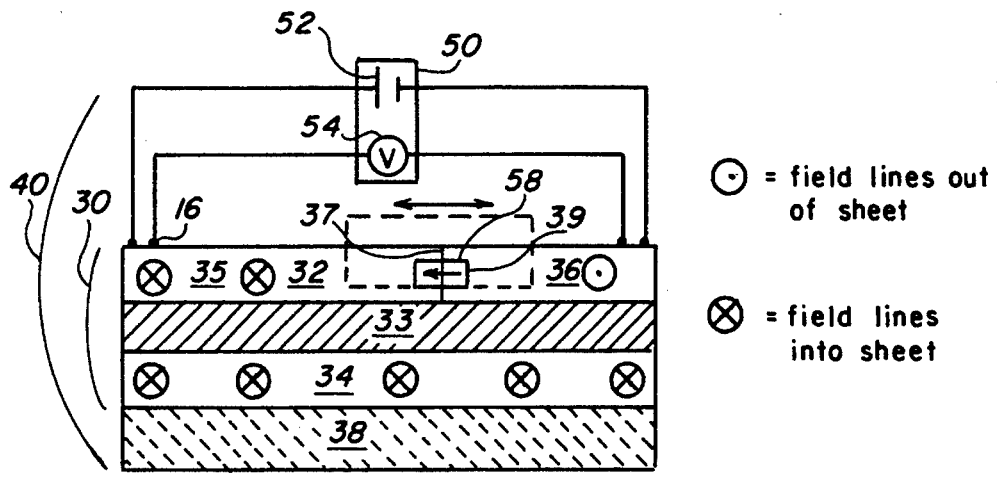
FIG. 4 is a cross-sectional view of a preferred embodiment of the invention.
Figure 5:
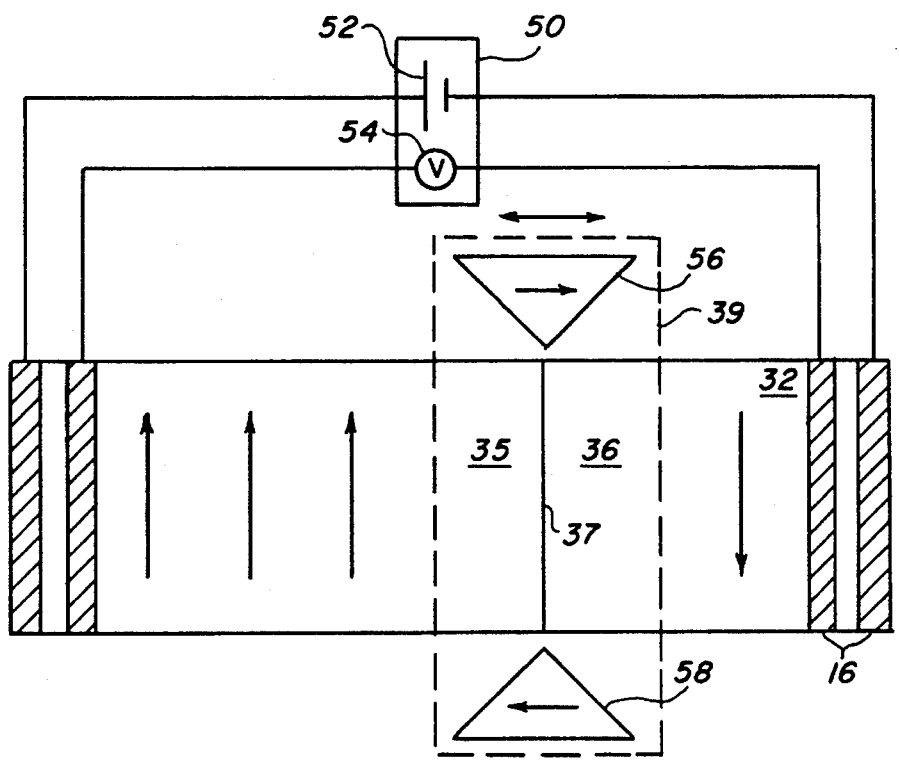
FIG. 5 is a top view of a preferred embodiment of the invention.

FIGS. 4 and 5 show, respectively, a cross-sectional view and a top view of a preferred embodiment 40 of the invention. In this embodiment of the invention, the laminar structure 30 is coupled to the first workpiece 38, shown in FIG. 4 as a substrate. The layer 34 with the fixed magnetic state (i.e., the magnetically harder layer) is disposed over the substrate, with the magnetic field lines oriented "into" the drawing sheet. Over, and contacted to, this layer 34 is the non-magnetic metal buffer layer 33. Over and contacted to this buffer layer 33 is the magnetically softer layer 32, preferably with the magnetic field lines on one side 35 of the domain wall 37 oriented "into" the drawing sheet, and with the magnetic field lines on the other side 36 of the domain wall 37 oriented "out of" the drawing sheet. A standard four-probe configuration connects the laminar structure 30 to an ohmmeter 50 (comprising a constant current source 52 and a volt meter 54, connected in parallel), which provides the operating current and measures the electrical resistance of the structure 30.

Figure 6:
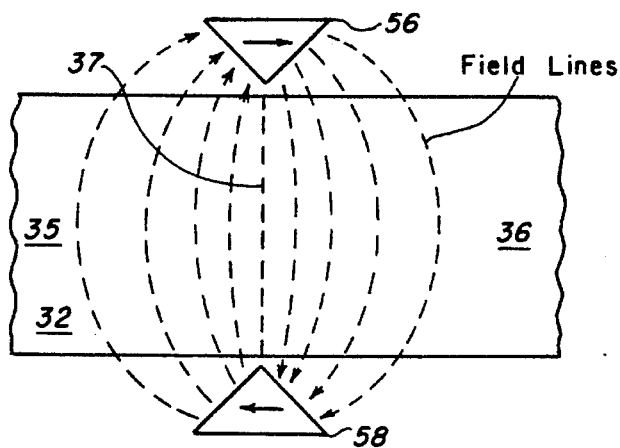
FIG. 6 is a detailed view of a pair of indexing magnets positioned for inducing a domain wall in a soft magnetic layer according to the invention.

As shown in FIG. 6, a pair of indexing magnets 56,58 with preferably opposing magnetic fields are positioned to induce the domain wall 37 in the softer magnetic layer 32 where this domain wall 37 is perpendicular to the opposing magnetic fields. These magnets 56,58 are coupled to the second workpiece (not shown). This configuration of magnets is particularly preferred, because it provides a very well defined domain wall 37 in the softer magnetic layer 32. Skilled practitioners will recognize, however, that many configurations for inducing a domain wall are known. In selecting a particular means for inducing a domain wall, skilled practitioners will consider minimizing hysteresis and maximizing domain wall definition, following known principles of ferromagnetism. It is preferred to minimize hysteresis in the domain wall to improve two-way precision in the sensor.

Preferred materials for the harder magnetic layer 34 include hard ferromagnetic materials (e.g., Co, Fe, and alloys thereof)i and antiferromagnetically-pinned materials. In a sense, antiferromagnetic materials are the hardest magnetic materials, because their net magnetic fields are completely insensitive to external magnetic fields. Consequently, use of an antiferromagnetic layer 81 to pin the hard magnetic layer 34 permits the use of a relatively hard magnetic material (e.g., Fe) for the softer magnetic layer. Suitable antiferromagnetic materials for pinning include FeMn and rare earth alloys (e.g., TbFe). In a typical embodiment of the invention, the layer (which may be ferromagnetic or antiferromagnetic) having a fixed magnetic state comprises an antiferromagnetic material coated with a thin film of a ferromagnetic metal.

Figure 7:
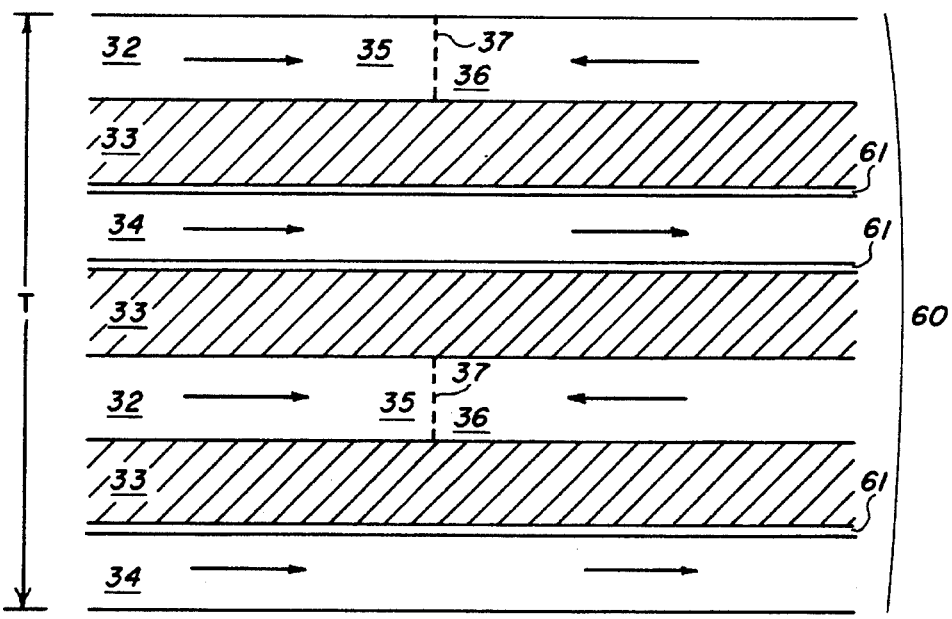
FIG. 7 is a cross-sectional view of a multilaminate structure according to the invention.

Many ferromagnetic materials have poor scattering efficiency, which will result in poor magnetic polarization. Preferably, as shown in FIG. 7, the interfacial regions this layer 34 will include a thin coating 61 (1 to 5 atoms thickness is sufficient) of a strong scattering element, such as Fe, to enhance magnetic polarization. Preferably, the harder magnetic layer 34 will be between about 50 Å and about 1000 Å thick. Other exemplary hard magnetic materials are described in U.S. Pat. No. 4,402,770 by Koon.

Preferred materials for tile softer magnetic layer 32 include Ni, Fe, permalloy, Co, and combinations thereof (such as alloys and multilayer sandwiches). Generally speaking, in magnetically hostile environments it is preferred to use a relatively hard magnetic material for this layer 32, to avoid interference problems. In environments that are not magnetically hostile it is preferred to use a magnetic material in which it is easy to establish a well-defined domain wall. Preferably, the softer magnetic layer 32 will be between about 50 Å and about 1000 Å thick. Other exemplary soft magnetic materials are described in U.S. Pat. No. 4,409,043 by Koon.

FIG. 7 also shows another laminar structure 60 according to the present invention. In this multilayered embodiment, a plurality of softer magnetic layers 32 and a plurality of harder magnetic layers 34 are interlaced, and the magnetic layers 32,34 are separated by and in contact with nonmagnetic buffer layers 33. This multilayered configuration provides enhanced dynamic range for the sensor, up to the limit of the thickness T being less than or equal to the spin relaxation distance.

Preferred materials for the nonmagnetic buffer layer 33 include Cu, Pt, Ag, Au, and combinations thereof. Preferably, the nonmagnetic buffer layer 33 will be between about 50 Å and about 1000 l thick.

Skilled practitioners will recognize that it is preferred to configure this sensor 40 so that the electrical resistance of the laminate structure 30 is several orders of magnitude lower (typically about nine orders of magnitude lower) than the resistance through the voltmeter 54, so that essentially all the current from the constant current source 52 goes through the laminate structure 30. Skilled practitioners will also recognize that it is preferred to maximize gain ($\Delta R/R$) for the sensor.

Figure 8:
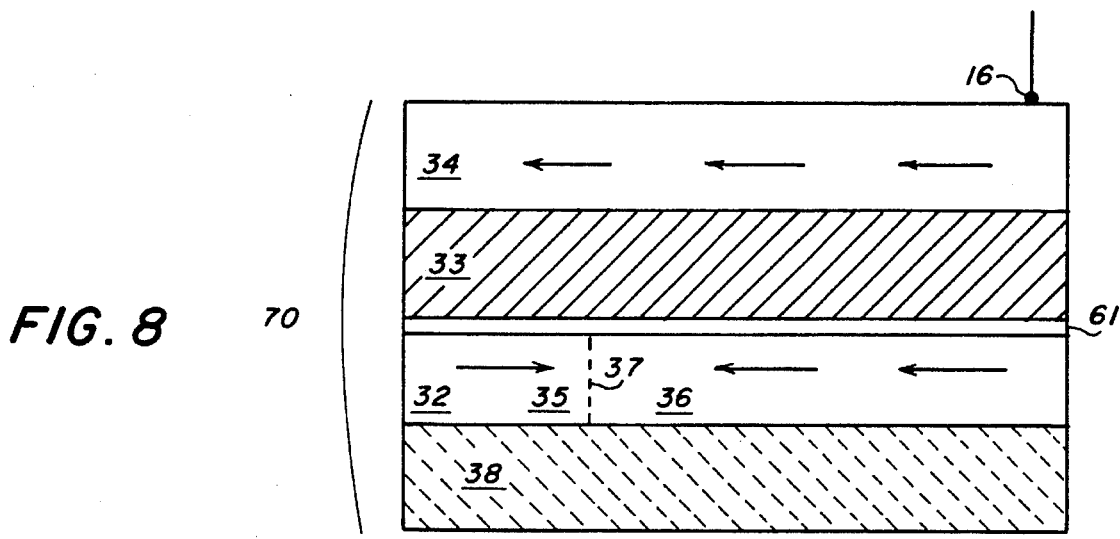
FIG. 8 is a cross-sectional view of another laminate structure according to the invention, with the hard magnetic layer over the soft magnetic layer.

FIG. 8 shows another laminar structure 70 according to the invention. In this embodiment of the invention, the magnetically harder layer 34 is the top layer. This layer 34 spin-polarizes the injected carriers. The magnetically softer layer 32 is the bottom layer. A non-magnetic buffer layer 33 contacts with and separates the two magnetic layers 32,34. Since the interface with the magnetically softer layer 32 will be the scattering surface in this embodiment, a thin film 61 of a high efficiency scattering element may be provided to increase scattering efficiency.

Figure 9:
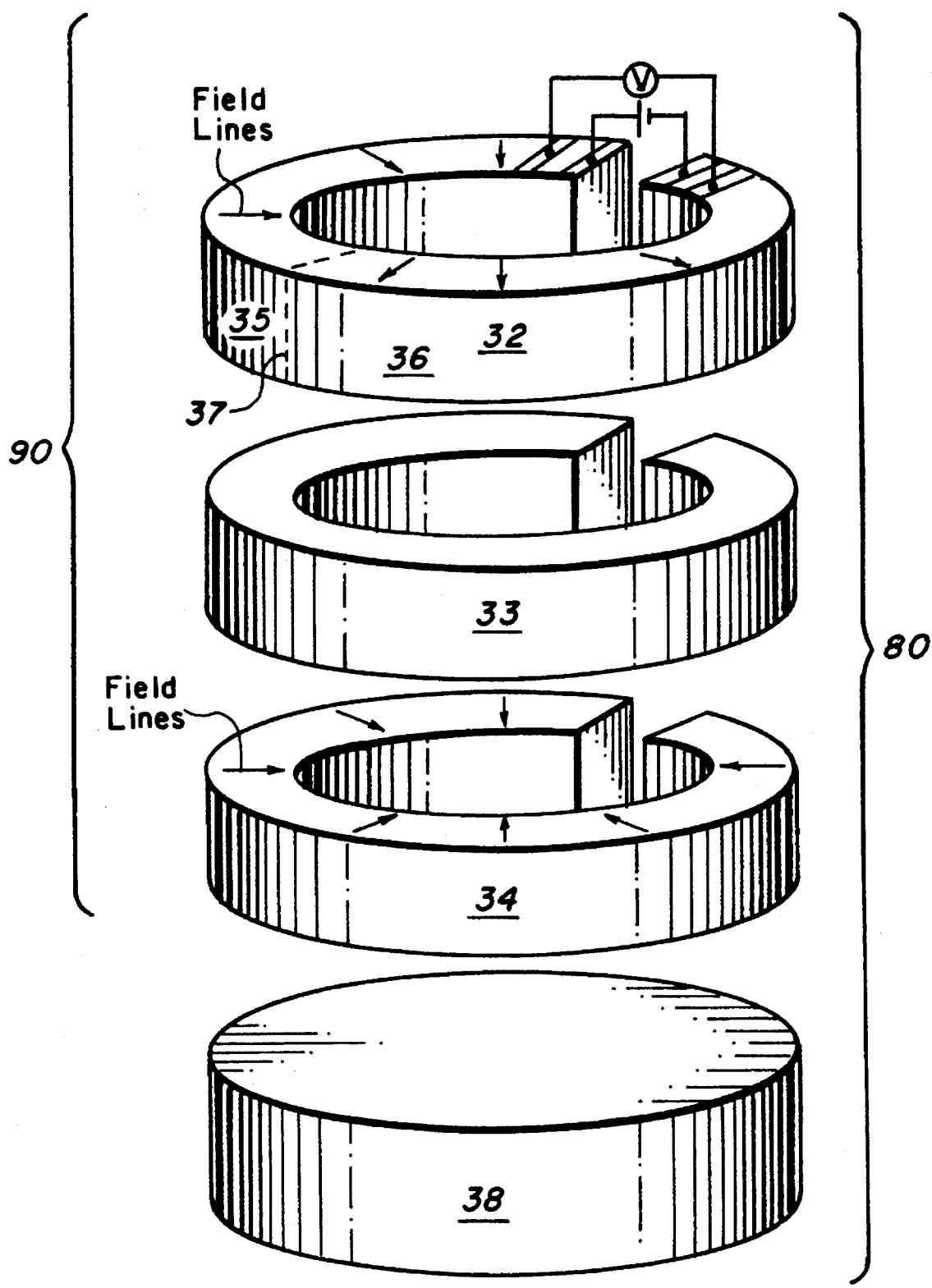
FIGS. 9 and 10 are an exploded view and a top view, respectively, of another embodiment of the invention.
Figure 10:
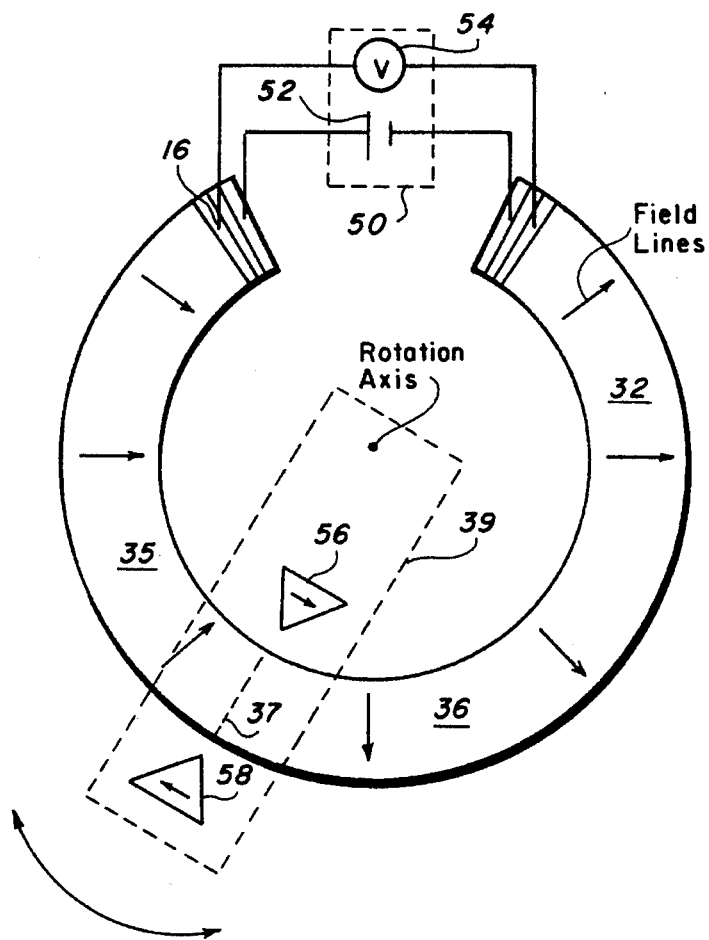

FIGS. 9 and 10 show an embodiment of the invention that operates as an angular displacement sensor 80. In this embodiment of the invention, one of the workpieces 38 will have an axis of rotation relative to the second workpiece 39. As shown in FIG. 9, in this embodiment of the invention, the magnetoresistant strip 90 forms an essentially arcuate member having a center essentially on this axis of rotation. The harder magnetic layer is an open ring 34 having a fixed magnetic state. The softer magnetic layer is an open ring 32 having a domain wall 37 induced by one or more indexing magnets (not shown) separating regions 35,36 of non-aligned, preferably opposing, magnetic field. The two magnetic layers again are in contact with and separated by a nonmagnetic metal buffer layer 33.

As shown in FIG. 10, a pair of indexing magnets 56,58 preferably are positioned for inducing a domain wall 37 separating regions 35,36 of opposing magnetic polarity. These indexing magnets are coupled to the second workpiece 39, which is rotatably mounted for moving, as indicated by the arrows, about the axis of rotation, so that the angular displacement of the domain wall 37 follows the angular displacement of the second workpiece 39. The ends of the softer magnetic ring 33 are coupled, through a standard four probe arrangement, to a voltmeter 54 and a constant current source 52, connected in parallel.

Figure 11:
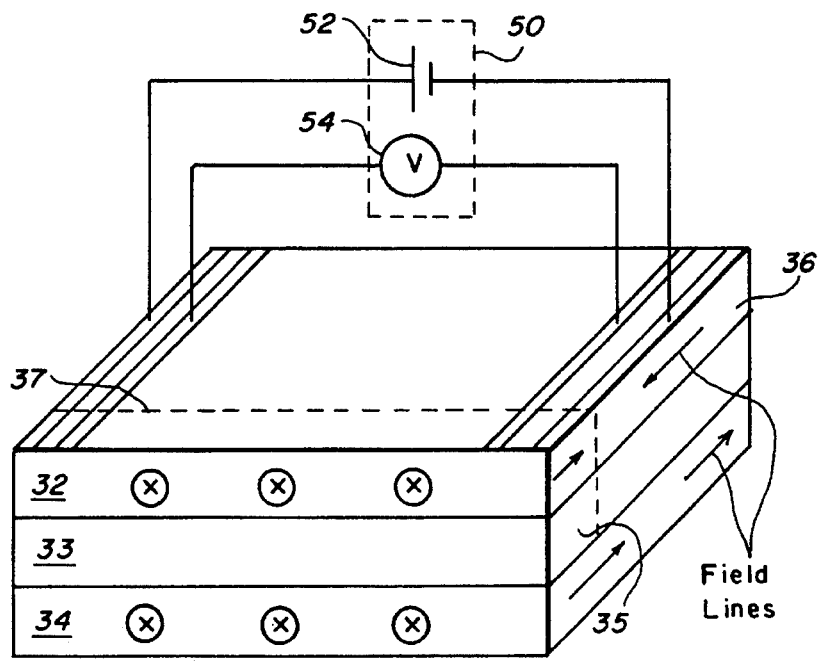
FIG. 11 is a perspective view of another embodiment of the invention, with the domain wall parallel to the direction of current flow in the laminar structure.

As shown in FIG. 11, another preferred embodiment of the invention has the domain wall 37 induced parallel to the direction of current flow. In this embodiment of the invention, the indexing magnets (not shown) are movably positioned for inducing a domain wall parallel to the direction of current flow in the laminar structure. In this embodiment of the invention, the position of the domain wall will determine the effective cross-sectional area of the conductor, thereby determining the resistance across the laminar structure.

Any of the embodiments of the invention may also be operated as a variable resistor. Operating the present invention as a variable resistor entails positioning the indexing magnet(s), thereby positioning the domain wall in the softer magnetic layer, producing a desired resistance across the laminar structure.

Obviously, many modifications and variations of the present invention are possible in light of the above teachings. It is therefore to be understood that, within the scope of the appended claims, the invention may be practiced otherwise than as specifically described.

What is claimed is:

1. A sensor for measuring the displacement between a first workpiece and a second workpiece, comprising:

a giant magnetoresistant strip fixed to said first workpiece, wherein said magnetoresistant strip further comprises at least one laminate structure, wherein said laminate structure comprises a first hard ferromagnetic or anti-ferromagnetically-pinned layer, a second magnetic layer over said first hard ferromagnetic or antiferromagnetic layer, wherein said second magnetic layer comprises a softer magnetic material than said first layer, and a conductive layer interposed between and contacting said first and second layers, for preventing essentially all exchange coupling between said first and second layers;

inducing means for inducing a domain wall, at a measurand position, between regions of magnetic fields in said second magnetic layer, wherein said magnetic fields are not aligned with each other, wherein said inducing means is fixed to said second workpiece; and measuring means for measuring electrical resistance between points on said magnetoresistant strip, thereby measuring said position of said domain wall, thereby measuring the position of said second workpiece relative to said first workpiece.

2. The sensor of claim 1, wherein said inducing means comprises one or more indexing magnets.

3. The sensor of claim 2, wherein said one or more indexing magnets comprise at least two indexing magnets having essentially opposing magnetic moments, disposed on opposing sides of said magnetoresistant strip, wherein said essentially opposing magnetic moments in said opposing indexing magnets are essentially perpendicular to said domain wall.

4. The sensor of claim 1, wherein said measuring means comprises means for directing current through said magnetoresistant strip and means for measuring the voltage across said magnetoresistant strip.

5. The sensor of claim 1, wherein said ferromagnetic or antiferromagnetic layer having a fixed magnetic state comprises a metal selected from the group consisting of Cr, Co, Fe, Ni, Mn, and alloys thereof.

6. The sensor of claim 1, wherein said ferromagnetic or antiferromagnetic layer having a fixed magnetic state comprises an antiferromagnetic metal coated with a thin film of a ferromagnetic metal.

7. The sensor of claim 1, wherein said layer comprising a softer magnetic material comprises a metal selected from the group consisting of Fe, Co, Mn, Ni, and alloys thereof.

8. The sensor of claim 1, wherein said sensor is a linear displacement sensor, and wherein said magnetoresistant strip forms an essentially straight member having a direction of current flow that is essentially perpendicular to said domain wall.

9. The sensor of claim 1, wherein said sensor is a linear displacement sensor, and wherein said magnetoresistant strip forms an essentially straight member having a direction of current flow that is essentially parallel to said domain wall.

10. The sensor of claim 1, wherein said sensor is an angular displacement sensor for measuring the rotation of said second workpiece relative to said first workpiece, wherein said second workpiece is mounted to rotate about an axis of rotation relative to said first workpiece, wherein said magnetoresistant strip forms an essentially arcuate member having a center essentially on said axis of rotation, wherein said means for inducing said domain wall comprises means for inducing a domain wall essentially radial to said arcuate member.

11. A sensor for measuring the displacement between a first workpiece and a second workpiece, comprising:

a magnetoresistant strip fixed to said first workpiece, comprising a plurality of hard ferromagnetic or antiferromagnetic layers alternating with a plurality of magnetic layers comprising a softer magnetic material, wherein each of said ferromagnetic or antiferromagnetic layers and said layers comprising said softer magentic material contact with and are separated by nonmagnetic conductive layers interposed between said magnetic layers, for preventing essentially all exchange coupling between said magnetic layers, means for inducing domain walls, at measurand positions, between regions of magnetic fields in said softer magnetic layers, wherein said magnetic fields are not aligned with each other, wherein said inducing means is fixed to said second workpiece; and means for measuring electrical resistance between points on said magnetoresistant strip, thereby measuring said positions of said domain walls, thereby measuring the position of said second workpiece relative to said first workpiece.

12. A variable resistor, comprising:

a magnetoresistant strip, comprising at least one laminate structure, wherein said laminate structure comprises a first hard ferromagnetic or antiferromagnetically-pinned layer having a fixed magnetic state, a second magnetic layer over said first magnetic layer, and a nonmagnetic conductive layer interposed between and contacting said magnetic layers, wherein said second magnetic layer comprises a softer magnetic material than said first magnetic layer;

means for inducing a domain wall, at a selected point, between regions of nonaligned magnetic field in said second magnetic layer, thereby setting the resistance across said magnetoresistant strip to a selected value; and means for moving said means for inducing said domain wall to a selected position, thereby changing the resistance across said magnetoresistant strip.

13. A sensor for measuring the relative movement in a selected direction between a first workpiece and a second workpiece, comprising:

a giant magnetoresistant strip fixed to said first workpiece, wherein said magnetoresistant strip comprises at least one laminate structure, wherein said laminate structure comprises a first hard ferromagnetic or antiferromagnetically-pinned layer, a second magnetic layer over said first hard ferromagnetic or antiferromagnetic layer, wherein said second magnetic layer comprises a softer magnetic material than said first layer, and a conductive layer interposed between and contacting said first and second layers, for preventing essentially all exchange coupling between said first and second layers;

inducing means for inducing a domain wall, between regions of magnetic fields in said second magnetic layer, wherein said magnetic fields are not aligned with each other, wherein said inducing means is fixed to said second workpiece; and measuring means for measuring changes in electrical resistance between points on said magnetoresistant strip, thereby measuring the movement of said domain wall in said selected direction, thereby measuring the movement of said second workpiece relative to said first workpiece in said selected direction.

14. The sensor of claim 13, wherein said inducing means comprise at least two indexing magnets having essentially opposing magnetic moments, disposed on opposing sides of said magnetoresistant strip, wherein said essentially opposing magnetic moments in said opposing indexing magnets are essentially perpendicular to said domain wall.

15. The sensor of claim 13, wherein said ferromagnetic or antiferromagnetic layer comprises a metal selected from the group consisting of Cr, Co, Fe, Ni, Mn, and alloys thereof.

16. The sensor of claim 13, wherein said ferromagnetic or antiferromagnetic layer comprises an antiferromagnetic material coated with a thin film of a ferromagnetic metal.

17. The sensor of claim 13, wherein said layer comprising a softer magnetic material comprises a metal selected from the group consisting of Fe, Co, Mn, Ni, and alloys thereof.

18. The sensor of claim 13, wherein said sensor is a linear displacement sensor, and wherein said magnetoresistant strip forms an essentially straight member perpendicular to said domain wall.

19. The sensor of claim 13, wherein said sensor is a linear displacement sensor, and wherein said magnetoresistant strip forms an essentially straight member parallel to said domain wall.

20. The sensor of claim 13, wherein said sensor is an angular displacement sensor for measuring the rotation of said second workpiece relative to said first workpiece, wherein said second workpiece is mounted to rotate about an axis of rotation relative to said first workpiece, wherein said magnetoresistant strip forms an essentially arcuate member having a center essentially on said axis of rotation, wherein said means for inducing said domain wall comprises means for inducing a domain wall essentially radial to said arcuate member.

\* \* \* \* \*

UNITED STATES PATENT AND TRADEMARK OFFICE
CERTIFICATE OF CORRECTION

PATENT NO. : 5,475,304
DATED : December 12, 1995
INVENTOR(S) : Gary A. Prinz, et. al.

It is certified that error appears in the above-indentified patent and that said Letters Patent is hereby corrected as shown below:

Title page, line 2, change "Prinz" to --Prinz et al.--.

Title page, item [75], inventor: should read-- Gary A. Prinz, Alexandria, Va." to -- Gary A. Prinz, Alexandria, Va; John H. Hubbard, Jamestown, R.I.; and Frederick G. Parsons, Cranston, R.I.--.

Signed and Sealed this

Second Day of July, 1996

Attest:

BRUCE LEHMAN

Attesting Officer

Commissioner of Patents and Trademarks